US012434697B2

(12) United States Patent
Aggoune et al.

(10) Patent No.: US 12,434,697 B2
(45) Date of Patent: Oct. 7, 2025

(54) SYSTEM AND METHOD FOR CONTROLLING VEHICLE ENERGY CONSUMPTION USING SEGMENTED ROUTE OPTIMIZATION

(71) Applicants: BorgWarner US Technologies LLC, Wilmington, DE (US); OHIO STATE INNOVATION FOUNDATION, Columbus, OH (US)

(72) Inventors: Karim Aggoune, Auburn Hills, MI (US); Peter M. Olin, Ann Arbor, MI (US); Daniela Tufano, Naples (IT); Shobhit Gupta, Columbus, OH (US); Shreshta Rajakumar Deshpande, Columbus, OH (US); Marcello Canova, Columbus, OH (US)

(73) Assignees: BORGWARNER US TECHNOLOGIES LLC, Wilmington, DE (US); TUFANO, Naples (IT); GUPTA, RAJAKUMAR DESHPANDE AND CANOVA, Columbus, OH (US)

( * ) Notice: Subject to any disclaimer, the term of this patent is extended or adjusted under 35 U.S.C. 154(b) by 303 days.

(21) Appl. No.: 17/589,931

(22) Filed: Feb. 1, 2022

(65) Prior Publication Data

US 2023/0242111 A1 Aug. 3, 2023

(51) Int. Cl.
*B60W 30/14* (2006.01)
*B60L 15/20* (2006.01)
*B60W 20/12* (2016.01)

(52) U.S. Cl.
CPC ....... *B60W 30/143* (2013.01); *B60L 15/2045* (2013.01); *B60W 20/12* (2016.01);
(Continued)

(58) Field of Classification Search
None
See application file for complete search history.

(56) References Cited

U.S. PATENT DOCUMENTS 8,423,273 B2   4/2013  Mineta
9,045,126 B2   6/2015  Harty
(Continued)

FOREIGN PATENT DOCUMENTS

DE   102017206209 A1 * 10/2018

*Primary Examiner* — Wade Miles
*Assistant Examiner* — Jerrod Irvin Davis
(74) *Attorney, Agent, or Firm* — Dickinson Wright PLLC

(57) ABSTRACT

A method for controlling vehicle energy consumption includes identifying, using a cumulative net energy consumption of a vehicle traversing a route, one or more route segments of the route being traversed by the vehicle. The method also includes determining, for each route segment of the one or more route segments, a vehicle energy consumption profile and determining, for each of the one or more route segments, a profile for a target vehicle speed based on at least one route characteristic and a corresponding vehicle energy consumption profile. The method also includes, for a respective route segment of the one or more route segments generating one or more torque commands based on at least the target vehicle speed profile corresponding to the respective route segment, and selectively controlling, using the one or more torque commands, vehicle propulsion of the vehicle to achieve the target vehicle speed profile.

20 Claims, 6 Drawing Sheets

(52) U.S. Cl.
CPC ... *B60W 2510/244* (2013.01); *B60W 2520/10* (2013.01); *B60W 2530/10* (2013.01); *B60W 2552/15* (2020.02); *B60W 2555/60* (2020.02); *B60W 2710/0666* (2013.01); *B60W 2710/083* (2013.01); *B60W 2720/10* (2013.01); *B60W 2720/12* (2013.01)

(56) References Cited

U.S. PATENT DOCUMENTS

| | | | |
|---|---|---|---|
| 9,469,213 | B2 | 10/2016 | Zhao et al. |
| 9,545,915 | B2 | 1/2017 | Phillips et al. |
| 9,605,606 | B2 | 3/2017 | Dufford et al. |
| 9,616,771 | B2 | 4/2017 | Grossard et al. |
| 10,392,003 | B2 | 8/2019 | Hawley |
| 10,393,533 | B2 | 8/2019 | Upadhyay et al. |
| 2008/0183490 | A1* | 7/2008 | Martin .................. B61L 27/16 705/1.1 |
| 2009/0259363 | A1* | 10/2009 | Li ..................... B60W 50/0097 180/65.265 |
| 2017/0232943 | A1 | 8/2017 | Brooks et al. |
| 2018/0082495 | A1 | 3/2018 | Koebler et al. |
| 2020/0124432 | A1* | 4/2020 | Heap ................... G05D 1/0217 |
| 2020/0207378 | A1* | 7/2020 | Lavertu ................. B61C 17/00 |
| 2020/0216066 | A1* | 7/2020 | Aggoune ............. B60W 40/02 |
| 2020/0216067 | A1 | 7/2020 | Olin et al. |
| 2022/0205796 | A1* | 6/2022 | Wray .................. G01C 21/3407 |
| 2023/0118287 | A1* | 4/2023 | Bruneau ................ G01C 21/20 701/32.1 |
| 2023/0152110 | A1* | 5/2023 | Berney-Dale ...... G01C 21/3469 701/123 |

\* cited by examiner

SYSTEM AND METHOD FOR CONTROLLING VEHICLE ENERGY CONSUMPTION USING SEGMENTED ROUTE OPTIMIZATION

GOVERNMENT LICENSE RIGHTS

This invention was made with government support under the DE-AR0000794 contract awarded by United States Department of Energy, Advanced Research Projects Agency (ARPA-E). The government has certain rights in the invention.

TECHNICAL FIELD

This disclosure relates to vehicle propulsion control, and in particular to systems and methods for improving vehicle energy efficiency through vehicle propulsion control.

BACKGROUND

Vehicles, such as cars, trucks, sport utility vehicles, crossovers, mini-vans, commercial vehicles, military vehicles, or other suitable vehicles, include a powertrain system that includes, for example, a propulsion unit, a transmission, drive shafts, wheels, and other suitable components. The propulsion unit may include an internal combustion engine, an energy cell, one or more electric motors, and the like. A hybrid vehicle may include a powertrain system comprising more than one propulsion unit. For example, a hybrid vehicle may include an internal combustion engine and an electric motor that cooperatively operate to propel the vehicle. The vehicle may also include a plug-in hybrid electric vehicle (PHEV) or a battery electric vehicle (BEV).

An operator of the vehicle may interact with a computing device, such as personal computing device, a mobile computing device, or a computing device integrated into the vehicle, to select a route between the vehicle's current location (e.g., or other starting or initial location) and a desired destination location. For example, the operator may provide information (e.g., an address, global positioning coordinates, and the like) to the computing device indicating a starting location (e.g., or initial location or origin) and a desired destination. Additionally, or alternatively, the current location of the vehicle may be determined by the computing device and the desired destination may be suggested or provided by the computing device (e.g., based on travel history, time of day, etc.) or the operator may provide the desired destination. The computing device may identify routes between a starting location or the vehicle's current location (e.g., determined using a global position system or other suitable system) and the desired destination and present the identified routes to the operator.

SUMMARY

This disclosure relates generally to vehicle propulsion control systems and methods.

An aspect of the disclosed embodiments is a method for controlling vehicle energy consumption. The method includes identifying, using a cumulative net energy consumption of a vehicle traversing a route, one or more route segments of the route being traversed by the vehicle. The method also includes determining, for each route segment of the one or more route segments, a vehicle energy consumption profile and determining, for each of the one or more route segments, a profile for a target vehicle speed based on at least one route characteristic and a corresponding vehicle energy consumption profile. The method also includes, for a respective route segment of the one or more route segments generating one or more torque commands based on at least the target vehicle speed profile corresponding to the respective route segment, and selectively controlling, using the one or more torque commands, vehicle propulsion of the vehicle to achieve the target vehicle speed profile.

Another aspect of the disclosed embodiments includes a system for controlling vehicle energy consumption. The system includes a processor and a memory. The memory includes instructions that, when executed by the processor, cause the processor to: identify, using a rolling buffer corresponding to a cumulative net energy consumption of a vehicle traversing a route, one or more route segments of the route being traversed by the vehicle; determine, for each route segment of the one or more route segments, a vehicle energy consumption profile; determine, for each of the one or more route segments, a profile for a target vehicle speed based on at least one route characteristic and a corresponding vehicle energy consumption profile; for a respective route segment of the one or more route segments: generate one or more torque commands based on at least the target vehicle speed profile corresponding to the respective route segment; and selectively control, using the one or more torque commands, vehicle propulsion of the vehicle to achieve the target vehicle speed profile.

Another aspect of the disclosed embodiments includes an apparatus for controlling vehicle energy consumption. The apparatus includes instructions that, when executed by the processor, cause the processor to: identify, using a rolling buffer corresponding to a projected cumulative net energy consumption of a vehicle traversing a route, one or more route segments of the route being traversed by the vehicle; determine, for each route segment of the one or more route segments, a projected vehicle energy consumption profile; determine, for each of the one or more route segments, a profile for a target vehicle speed based on at least one route characteristic and a corresponding vehicle energy consumption profile; determine, for each route segment of the one or more route segments, a state of charge profile for at least one battery of the vehicle based on at least one state of charge parameter; for a respective route segment of the one or more route segments: generate one or more torque commands based on at least the target vehicle speed profile and a state of charge profile corresponding to the respective route segment; and selectively control, using the one or more torque commands, vehicle propulsion of the vehicle to achieve the target vehicle speed profile.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
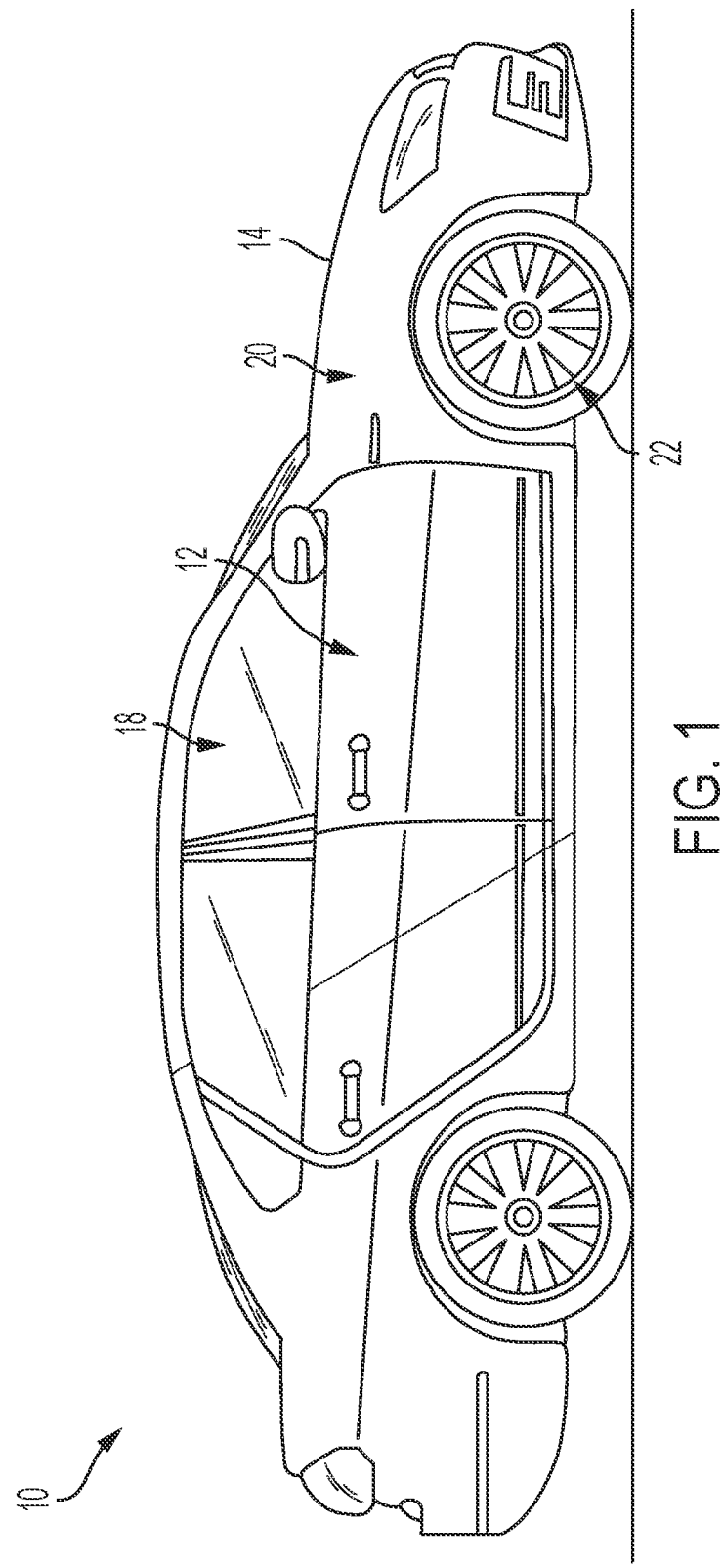
FIG. 1 generally illustrates a vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, commercial vehicles, military vehicles, or other suitable vehicles, include a powertrain system that includes, for example, a propulsion unit, a transmission, drive shafts, wheels, and other suitable components. The propulsion unit may include an internal combustion engine, an energy cell, one or more electric motors, and the like. A hybrid vehicle may include a powertrain system comprising more than one propulsion unit. For example, a hybrid vehicle may include an internal combustion engine and an electric motor that cooperatively operate to propel the vehicle. The vehicle may also include a plug-in hybrid electric vehicle (PHEV) or a battery electric vehicle (BEV).

An operator of the vehicle may interact with a computing device, such as personal computing device, a mobile computing device, or a computing device integrated into the vehicle, to select a route between the vehicle's current location (e.g., or other starting or initial location) and a desired destination location. For example, the operator may provide information (e.g., an address, global positioning coordinates, and the like) to the computing device indicating a starting location (e.g., or initial location or origin) and a desired destination. Additionally, or alternatively, the current location of the vehicle may be determined by the computing device and the desired destination may be suggested or provided by the computing device (e.g., based on travel history, time of day, etc.) or the operator may provide the desired destination. The computing device may identify routes between a starting location or the vehicle's current location (e.g., determined using a global position system or other suitable system) and the desired destination and present the identified routes to the operator.

In order to reduce energy consumption in such a vehicle, various systems and methods have been developed to optimize the operation of the vehicle over a route. The optimization may be based on enhanced route information (e.g., including speed limits, traffic and stop signs, grade and road curvature, roads intersection angle information, what is commonly known as route characteristic information, which may include cloud computing-based navigation information and/or other suitable characteristics or information, as described herein). Additionally, or alternatively, the optimization may include determining and providing optimized control inputs to the vehicle control systems. Such systems and methods, which may be referred to as route optimization routines, may face the challenge that as the length of the route gets longer, the time and the amount of computer resources required to perform the optimization routines may increase dramatically, making it difficult to either implement the logic on-board the vehicle (e.g., due to the required complexity of the on-board controllers), and/or to implement the logic off-board (e.g., on a remotely located computing device, such as a cloud computing device, and the like, due to communication latency times).

In addition, route characteristic information (e.g., which may include the cloud computing based navigation information) may only include route characteristics for a limited distance horizon. However, the calculation process of global route optimization algorithms may assume that the entire set of route characteristics is known when the optimization process is initiated (e.g., before beginning the drive to the destination). Such a constraint may limit the length of the routes that can be optimized with manageable computation time.

One example of a route optimization system may include a function (e.g., which may include a multi-horizon optimization function that uses a global optimization to determine the cost to go function) that determines the optimum vehicle speed and battery state of charge (SOC) profiles over the remaining route to the destination to achieve a requested balance between energy consumption and travel time. The function may output the target torque for the engine and the target torque for the electric motor that will lead to the optimum vehicle speed and state-of-charge (SOC) profiles. A point key to the calculation, is that a terminal constraint on the final battery SOC is required to solve the optimization, in order to ensure that the SOC at the end of the route is the same as at the beginning. Additionally, or alternatively, if the vehicle includes multiple power sources, the vehicle may operate in a charge sustaining mode, and the terminal constraint on the final batter SOC is required to solve the optimization, in order to ensure SOC neutrality. Conversely, if the terminal SOC were not constrained, the battery could be progressively discharged during the route, leading to errors in predicting the energy consumption and potential issues in managing the battery over subsequent routes.

However, such a route optimization routine may perform the full route optimization at the beginning of the route. For routes having lengths of even just a few miles, the computation time may be relatively long and as the length of the routes increase, optimization time quickly may increase into the minutes (e.g., which may be too long for a comfortable, driver-friendly interface). Further, as the route length increases, the computational resource requirements also increase. Finally, with a limited maximum data available from a device providing route characteristic information at the beginning of the route, such a routine may be further limited to perform the optimization function.

Accordingly, systems and methods, such as those disclosed herein, that optimize energy consumption for a plurality of route segments of a route being traversed by the vehicle, may be desirable. In some embodiments, in order to accommodate increasing computation time and resources required to obtain a pre-trip computation (e.g., of the route before the start of the trip) of the energy-optimal solution with increasing trip distance and the limited available horizon data from the device providing route characteristic information, the systems and methods described herein may be configured to segment the route from the origin to the destination into relatively short segments. The segments may include suitable distance or length, such as 1 kilometer, 2 kilometers, 3 kilometers, or other suitable distance or length. Additionally, or alternatively, at least some of the segments may include a distance or length that is different from other segments.

In some embodiments, the systems and methods described herein may be configured to, for each segment, perform the multi-horizon optimization function, with relatively low computational burden due to the reduced length used for the function (e.g., the segment length). The systems and methods described herein may be configured to, if no changes are made to the multi-horizon optimization as the vehicle traverses the route (e.g., which may result in the segmented solution being relatively sub-optimal), allow the SOC at the end of each intermediate segment (e.g., with exception of the last segment before the end of route) to vary between calibratable bounds (e.g., instead of constraining the SOC at the end of each segment to be the same as at the beginning of the segment). The systems and methods described herein may be configured to, for the overall route, allow the SOC to be the same at the end of the overall route as it was at the beginning of the route and/or allow for SOC neutrality throughout the route.

In some embodiments, the systems and methods described herein may be configured to define various aspects of the segments. For example, the systems and methods described herein may be configured to define a segment length, define SOC bounds to impose at the end of each intermediate segment, define adapting segments (e.g., using an all-electric range (AER) when the vehicle includes a plug-in hybrid electric vehicles (PHEV)), other suitable definitions, or a combination thereof.

In some embodiments, the segment lengths may be defined using the SOC of the battery of the vehicle. The systems and methods described herein may be configured to determine the SOC for each segment based on various SOC calibration parameters. The SOC calibration parameters may be based on vehicle speed limit change locations, traffic and stop sign locations, an optimization weighting parameter between energy consumption and travel time (e.g., which may be referred to herein as gamma), road grade and curvature, vehicle mass, battery size, other suitable parameters, or a combination thereof.

In some embodiments, the systems and methods described herein may be configured to determine the segments of the route based on defining a rolling buffer along the route and computing the projected cumulative net energy (e.g., kinetic energy and potential energy) to move the vehicle. The systems and methods described herein may be configured to approximate the kinetic energy based on speed limits along the route or other suitable information associated with the route. The systems and methods described herein may be configured to approximate the potential energy based on route elevation along the route or other suitable information associated with the route.

The systems and methods described herein may be configured to determine an end of a segment based on when the rolling buffer reaches a calibrated threshold. The systems and methods described herein may be configured to reset the rolling buffer, which may define the start of a subsequent segment. The systems and methods described herein may be configured to determine the cumulative net energy according to:

$$\text{Roll buff}(s_i) = \text{Roll buff}(s_{i-1}) + \alpha * Ec + \beta * \frac{dEc}{ds} + \gamma * \frac{dEp}{ds}$$

$$Ec = \frac{1}{2}mv^2$$

$$Ep = mgz$$

Where $\alpha$, $\beta$, and $\gamma$ are tuning coefficients, Roll buff is the cumulative kinetic and potential energy to move the vehicle, $s_i$ is step i along the route, Ec is the kinetic energy of the vehicle, Ep is potential energy of the vehicle, m is the mass of the vehicle, v is the velocity of the vehicle, g is gravity, z is the elevation.

In some embodiments, the systems and methods described herein may be configured to determine the SOC limits at the end of each segment (e.g., which may affect the amount of deviation from the optimum full route optimization), which may include allowing the SOC for each segment to approach the limits of the full route SOC optimum trajectory. The systems and methods described herein may be configured to establish the electrical energy utilization using by the multi-horizon optimization results. The systems and methods described herein may be configured to define the direction of battery usage (e.g., depletion or recharge), based on a similar approach to the segment length definition, and may be defined according to:

$$SOC(s_i) = SOC(s_{i-1}) - (A + SOC(s_i)) * B * Ec(i)) -$$

$$C * \min\left(0, \frac{dEc}{ds}\right) + \max\left(0, \frac{dEc}{ds}\right)$$

Where SOC is the state-of-charge of the battery, $s_i$ is step i along the route, Ec is the kinetic energy of the vehicle, $$\frac{dEc}{ds}$$

is the rate of change in kinetic energy over a step, and A, B, C, and D are tuning coefficients.

In some embodiments, the systems and methods may be configured to determine or define the segment lengths and SOC boundaries prior to optimizing the operation of the vehicle over a route. In some embodiments, the systems and methods may be configured to develop a learned heuristic (e.g., using machine learning over multiple trips by the same operator of the vehicle over the same or similar routes, or multiple trips by multiple operators of the vehicle over the same or similar routes, and the like) to predict the optimal segment length and terminal SOC bounds based on route feature recognition.

In some embodiments, the systems and methods described herein may be configured to, using the AER when the vehicle includes a PHEV, adapt the segmentation of a route by taking advantage of the potential for the operator to recharge the battery by plugging in at the destination. The systems and methods described herein may be configured to determine an appropriate, final SOC for the end of the route based on: a duration and/or characteristics of overall trip (e.g., road load energy consumption, and the like) and a relationship with AER capability of the vehicle; the presence of EV-only operating region(s) along route (e.g., which may be indicated by the various route characteristics described herein and may include regulated regions in city centers or particular neighborhoods, or selected by the operator through a graphical user interface); an availability of charging stations during or at the end of the route determined based on incorporated information about charging station availability, capability, and/or a length of planned stop at the destination (e.g., if a charging station will be available for use at the destination (whether at home, or away from home) then the final SOC at the destination can be lower); an intention of the operator to charge during trip, at end of trip, and/or a length of charging (e.g., the operator intention to charge during or at the end of the trip can be determined from operator input through a graphical user interface in the vehicle or other suitable computing device, and/or using data analytics techniques to track typical operator behavior to predict most likely behaviors on a route being traversed by the vehicle), other suitable information, or a combination thereof.

In some embodiments, the systems and methods described herein may be configured to identify, using a projected cumulative net energy consumption of a vehicle traversing a route, one or more route segments of the route being traversed by the vehicle. Each route segment of the one or more route segments may include a substantially equal segment length and/or at least some of the route segments may include a segment length that is different from at least one other route segment of the one or more route segments. It should be understood that the route segments may include any suitable length, including the same or substantially the same length, a combination of the same or substantially the same length (e.g., for some of the route segments) and at least one other segment length (e.g., for other route segments), a plurality of different segment lengths (e.g., for some or all of the route segments), or any suitable combination of segment lengths.

The projected cumulative net energy consumption of the vehicle may include a kinetic energy aspect and a potential energy aspect. The systems and methods described herein may be configured to determine the kinetic energy aspect of the cumulative net energy consumption of the vehicle based on one or more speed limits associated with the route being traversed by the vehicle, various traffic information, and/or other suitable information associated with the vehicle and/or the route. The systems and methods described herein may be configured to determine the potential energy aspect of the cumulative net energy consumption of the vehicle based on one or more route elevations associated with the route being traversed by the vehicle and/or other suitable information associated with the vehicle and/or the route.

The systems and methods described herein may be configured to determine, for each route segment of the one or more route segments, a projected vehicle energy consumption profile. The systems and methods described herein may be configured to determine, for each of the one or more route segments, a profile for a target vehicle speed based on at least one route characteristic and a corresponding vehicle energy consumption profile.

In some embodiments, the systems and methods described herein may be configured to determine, for each route segment of the one or more route segments, an SOC profile for at least one battery of the vehicle based on at least one SOC calibration parameter. The at least one SOC calibration parameter may include at least one of one or more vehicle speed limit change locations associated with the route being traversed by the vehicle, one or more traffic signal locations associated with the route being traversed by the vehicle, one or more stop sign locations associated with the route being traversed by the vehicle, a weight parameter associated energy consumption associated with the route being traversed by the vehicle and a travel time associated with the route being traversed by the vehicle, one or more road grades associated with the route being traversed by the vehicle, a vehicle mass associated with the vehicle, and a battery size associated with the at least one battery of the vehicle, other suitable SOC calibration parameters, or a combination thereof.

The systems and methods described herein may be configured to, for a respective route segment of the one or more route segments, generate one or more torque commands based on at least the target vehicle speed profile and/or the SOC profile corresponding to the respective route segment. The systems and methods described herein may be configured to selectively control, using the one or more torque commands, vehicle propulsion of the vehicle to achieve the target vehicle speed profile.

FIG. 1 generally illustrates a vehicle 10 according to the principles of the present disclosure. The vehicle 10 may include any suitable vehicle, such as a car, a truck, a sport utility vehicle, a mini-van, a cross-over, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position.

The passenger compartment 18 is disposed rearward of the engine compartment 20. The vehicle 10 may include any suitable propulsion system including an internal combustion engine, one or more electric motors (e.g., an electric vehicle), one or more energy cells, a hybrid (e.g., a hybrid vehicle) propulsion system comprising a combination of an internal combustion engine, one or more electric motors, and/or any other suitable propulsion system. In some embodiments, the vehicle 10 may include a petrol or gasoline energy engine, such as a spark ignition engine. In some embodiments, the vehicle 10 may include a diesel energy engine, such as a compression ignition engine. In some embodiments, the vehicle 10 may include a battery electric vehicle (BEV) comprising one or more onboard batteries or battery packs configured to provide energy to one or more electric motors of the propulsion system.

The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force which is translated through the transmission to one or more axles which turns wheels 22. When the vehicle 10 includes one or more electric motors, a vehicle battery and/or energy cell provides energy to the electric motors to turn the wheels 22. In cases where the vehicle 10 includes a vehicle battery to provide energy to the one or more electric motors, when the battery is depleted, it may be connected to an electric grid (e.g., using a wall socket) to recharge the battery cells. Additionally, or alternatively, the vehicle 10 may employ regenerative braking which uses the one or more electric motors of the vehicle 10 as a generator to convert kinetic energy lost due to decelerating back into stored energy in the battery.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

Figure 2:
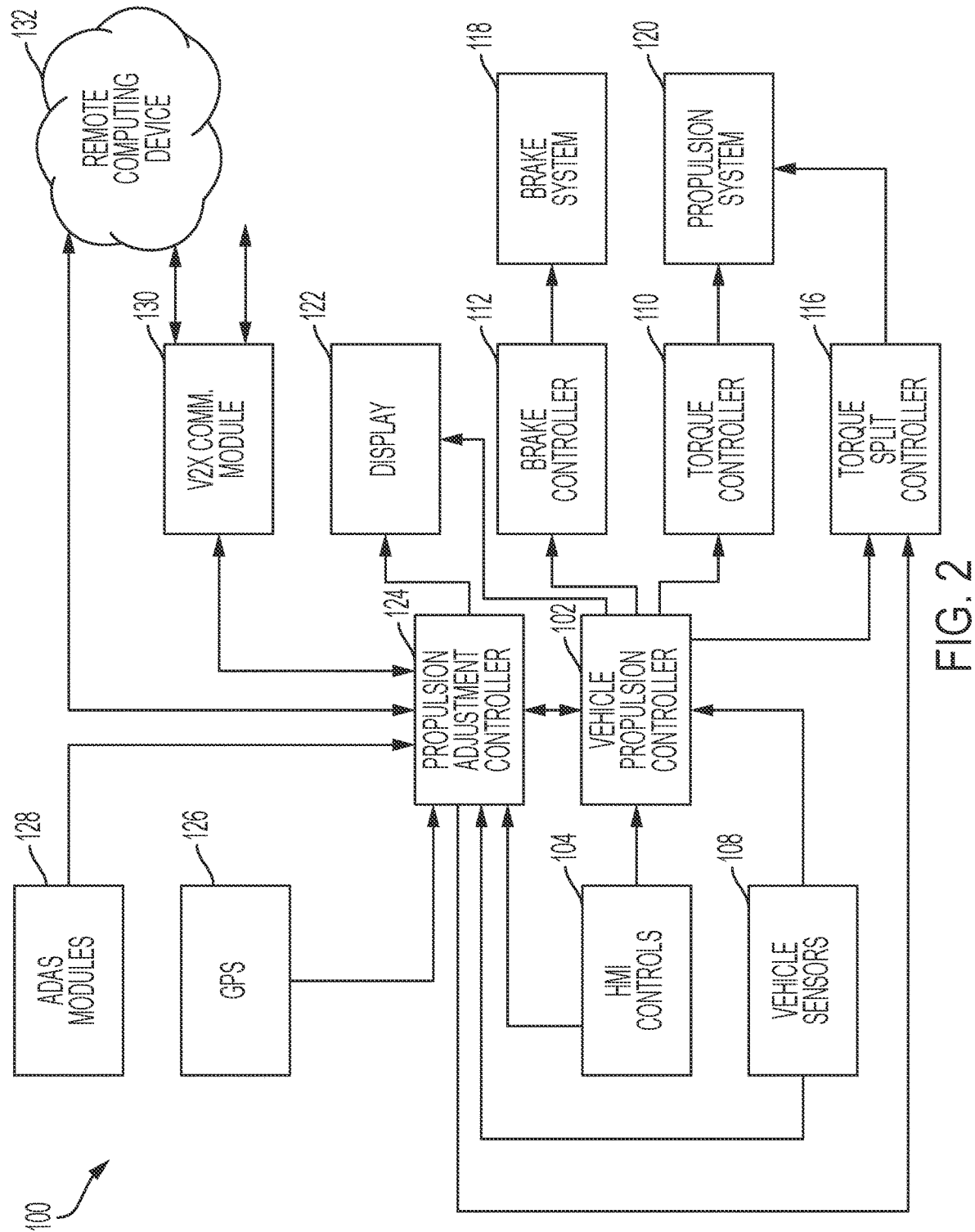
FIG. 2 generally illustrates a block diagram of a vehicle propulsion control system according to the principles of the present disclosure.

FIG. 2 generally illustrates a block diagram of a vehicle propulsion control system 100 according to the principles of the present disclosure. The system 100 may be disposed within a vehicle, such as the vehicle 10. The system 100 is configured to selectively control propulsion of the vehicle 10 and, in some embodiments, the system 100 is configured to determine profiles for a target vehicle speed and/or a target vehicle torque split based on various input information (e.g., route information, vehicle characteristic information, traffic information, other suitable information, or a combination thereof). The profiles of the target vehicle speed and/or the target vehicle torque split correspond to a vehicle speed at which the vehicle 10 achieves an optimum energy consumption efficiency with respect to a portion of a route being traversed by the vehicle 10.

In some embodiments, the system 100 may include a vehicle propulsion controller (VPC) 102, human machine interface (HMI) controls 104, vehicle sensors 108, a torque controller 110, a brake controller 112, a torque split controller 116, a brake system 118, a propulsion system 120, and a display 122. In some embodiment, the display 122 may include a portion of a dash or console of the vehicle 10, a navigation display of the vehicle 10, or other suitable displays of the vehicle 10. In some embodiments, the display 122 may be disposed on a computing device, such as a mobile computing device used by the driver. In some embodiments, the system 100 may include a propulsion adjustment controller (PAC) 124, a global position system (GPS) antenna 126 in communication with a mapping characteristics module (not shown), advanced driver assistance system (ADAS) modules 128, and a vehicle to other systems (V2X) communication module 130. The V2X communication module 130 may be configured to communication with other vehicles, other infrastructure (e.g., such as traffic infrastructure, mobile computing devices, and/or other suitable infrastructure), a remote computing device (e.g., the remote computing device 132), other suitable systems, or a combination thereof. As will be described, the system 100 may be in communication with one or more remote computing devices 132. In some embodiments, at least some of the components of the system 100 may be disposed in a propulsion control module (PCM) or other onboard vehicle computing device. For example, at least the PAC 124 and the VPC 102 may be disposed within the PCM. In some embodiments, the system 100 may be at least partially disposed within the PCM while other components of the system 100 are disposed on a standalone computing device having a memory that stores instructions that when executed by a processor cause the processor to carry out the operations of the components. For example, the PAC 124 may be disposed on a memory and executed by a processor. It should be understood that the system 100 may include any combination of computing devices, either disposed locally in the vehicle 10 and/or disposed remotely, as will be described.

In some embodiments, the VPC 102 may include an automatic vehicle propulsion system. For example, the VPC 102 may include a cruise control mechanism, an adaptive cruise control mechanism, an automatic braking system, other suitable automatic vehicle propulsion system, or a combination thereof. Additionally, or alternatively, the VPC 102 may include or be a portion of an autonomous vehicle system that controls all or a portion of vehicle propulsion, steering, braking, safety, route management, other autonomous features, or a combination thereof. It should be understood that, while only limited components of the system 100 are illustrated, the system 100 may include additional autonomous components or other suitable components.

The VPC 102 is in communication with one or more human to machine interfaces (HMI) 104. The HMI controls 104 may include any suitable HMI. For example, the HMI controls 104 may include a plurality of switches disposed on a steering wheel of the vehicle 10, on the dash or console of the vehicle 10, or any other suitable location on the vehicle 10. In some embodiments, the HMI controls 104 may be disposed on a mobile computing device, such as a smart phone, tablet, laptop computer, or other suitable mobile computing device. In some embodiments, the driver of the vehicle 10 may interface with the HMI controls 104 to use the VPC 102 to control vehicle propulsion and/or other features of the VPC 102. For example, the driver may actuate an HMI switch of the HMI controls 104 disposed on the steering wheel of the vehicle 10. The HMI controls 104 may communicate a signal to the VPC 102. The signal may indicate a desired vehicle speed selected by the driver. The VPC 102 generates a torque demand corresponding to the desired vehicle speed and communicates the torque demand to a torque controller 110. The torque controller 110 is in communication with the propulsion system 120 and/or other vehicle propulsion systems of the vehicle 10. The torque controller 110 selectively controls the propulsion system 120 and/or the other vehicle propulsion systems using the torque demand to achieve the desired vehicle speed. The driver may increase or decrease the desired vehicle speed by actuating additional switches of the HMI controls 104. The VPC 102 may adjust the torque demand to achieve the increase or decrease in the desired vehicle speed.

The VPC 102 may continuously adjust the torque demand in order to maintain the desired vehicle speed. For example, the VPC 102 may be in communication with the vehicle sensors 108. The vehicle sensors 108 may include cameras, speed sensors, proximity sensors, other suitable sensors as will be described, or a combination thereof. The VPC 102 may receive a signal from the vehicle sensors 108 that indicates a current vehicle speed. The VPC 102 may adjust the torque demand to adjust the vehicle speed when the signal indicates that the current vehicle speed is different from the desired vehicle speed. For example, the vehicle 10 may traverse an incline that causes the vehicle 10 to reduce current vehicle speed (e.g., because the torque demand applied by the torque controller 110 is insufficient to maintain vehicle speed while on the incline). The VPC 102 may increase the torque demand in order to adjust the current vehicle speed, thereby achieving the desired vehicle speed.

In some embodiments, such as when the VPC 102 includes an adaptive cruise control mechanism, the VPC 102 may adjust the torque demand based on the proximity of a lead vehicle (e.g., a vehicle immediately in front of the vehicle 10). For example, the VPC 102 may receive information from the vehicle sensors 108 indicating the presence of a lead vehicle. The information may be captured by the vehicle sensors 108 using cameras, proximity sensors, radar, the V2X communication module 130, other suitable sensors or input devices, or a combination thereof. The VPC 102 may determine whether to maintain the desired vehicle speed or increase or decrease the torque demand in order to increase or decrease the current vehicle speed. For example, the driver may indicate, using the HMI controls 104, to maintain pace with the lead vehicle while keeping a safe stopping distance between the vehicle 10 and the lead vehicle. The VPC 102 may selectively increase the torque demand if the lead vehicle is traveling faster than the vehicle 10 and may selectively decrease the torque demand if the lead vehicle is traveling slower relative to the vehicle 10.

The VPC 102 may bring the vehicle 10 to a complete stop when the lead vehicle comes to a complete stop. For example, the VPC 102 may be in communication with the brake controller 112 to send a plurality of signals over a period indicating to the brake controller 112 to control vehicle braking (e.g., the VPC 102 may bring the vehicle to a stop over a period so as not to suddenly stop the vehicle, however, in the case of a sudden stop of the lead vehicle, the VPC 102 brings the vehicle 10 to a sudden stop to avoid collision with the lead vehicle). The brake controller 112 may be in communication with the brake system 118. The brake system 118 may include a plurality of brake components that are actuated in response to the brake controller 112 implementing braking procedures based on the plurality of signals from the VPC 102. In some embodiments, the VPC 102 may implement engine braking through a regenerative braking system by adjusting the torque demand to allow the vehicle 10 to come to a stop without use of the brake system 118 or the VPC 102 may use a combination of regenerative braking and the brake system 118 to bring the vehicle 10 to a complete stop. In order to resume vehicle propulsion control, the driver indicates to resume vehicle propulsion control using the HMI controls 104 (e.g., the VPC 102 is not configured to resume vehicle propulsion control without interaction from the driver). In some embodiments, the vehicle 10 may include a higher level of automation including a higher level of propulsion control, as described, and may include suitable controls for bringing the vehicle 10 to a complete stop without interaction with the driver of the vehicle 10.

In some embodiments, the VPC 102 may determine a torque split in order to utilize an internal combustion engine and an electric motor of the vehicle 10 (e.g., in the case where the vehicle 10 is a hybrid vehicle). It should be understood that while only an internal combustion engine and an electric motor are described, the vehicle 10 may include any hybrid combination of any suitable vehicle engines and motors. The torque split indicates a portion of the torque demand to be applied to the internal combustion engine and a portion of the torque demand to be applied to the electric motor. For example, the electric motor may be used for vehicle propulsion when the torque demand is below a threshold. However, when the torque demand is above the threshold (e.g., such as the case when the vehicle 10 is on a steep incline) the internal combustion engine may provide at least a portion of vehicle propulsion in order to assist the electric motor. The VPC 102 communicates the torque split to the torque split controller 116. The torque split controller 116 is in communication with the propulsion system 120 to apply the torque split.

In some embodiments, the VPC 102 includes a plurality of safety controls. For example, the VPC 102 may determine whether to increase or decrease the torque demand, thereby increasing or decreasing the desired vehicle speed or current vehicle speed, based on input from the safety controls. The safety controls may receive input from the vehicle sensors 108. For example, the safety controls may receive proximity sensor information, camera information, other information, or a combination thereof and may generate a safety signal that indicates to the VPC 102 to perform one or more safety operations. For example, in the case of a lead vehicle coming to a sudden stop, the safety controls may generate a safety signal, based on proximity information from the vehicle sensors 108, indicating to the VPC 102 to immediately bring the vehicle 10 to a complete stop. In some embodiments, the VPC 102 may determine whether to apply the desired vehicle speed set by the driver using the HMI controls 104 based on the signal from the safety controls. For example, the driver may increase the desired vehicle speed which may bring the vehicle 10 closer to the lead vehicle (e.g., the vehicle 10 would travel faster than the lead vehicle if the desired vehicle speed were achieved). The VPC 102 may determine not to apply the desired vehicle speed, and instead may provide an indication to the display 122 indicating to the driver that increasing the desired vehicle speed may be unsafe or the VPC 102 may ignore the increase in the desired vehicle speed. In case of a distance reduction from the ego vehicle to the lead vehicle, the VPC 102 may switch its control from a vehicle speed based target to an ego-to-lead vehicle distance based target. In some embodiments, the VPC 102 may be in communication with a transmission controller module (TCM). The VPC 102 may receive information from the TCM (e.g., an automatically selected gear) and may determine and/or adjust the total torque demand based on the information received from the TCM.

As described, the system 100 includes a PAC 124. The PAC 124 is configured to determine a profile for a target vehicle speed based on, at least, route information of a route being traversed by the vehicle 10, vehicle parameters of the vehicle 10, information about other vehicles proximate to the vehicle 10, traffic information, weather information, the current vehicle speed, the desired vehicle speed, other information, or a combination thereof. As will be described, the PAC 124 may determine the profile for the target vehicle speed based on an energy consumption profile of the vehicle 10. The energy consumption profile may be generated using the information described above and may indicate an optimum energy consumption of the vehicle 10 for various route characteristics, such as road grades, curvatures, traffic, speed limits, stop signs, traffic signals, other route characteristics, or a combination thereof.

The PAC 124 receives route characteristics (e.g., road grade characteristics, route distance, and route directions), vehicle parameters, traffic characteristics, weather characteristics, vehicle to vehicle parameters, other information or characteristics, or a combination thereof. In some embodiments, the PAC 124 receives at least some of the route characteristics from a mapping characteristics module based on location information from the GPS antenna 126. The mapping characteristics module disposed within the vehicle 10 (e.g., within the system 100) or may be disposed on a remote computing device, such as the remote computing device 132. When the mapping characteristics module is disposed on the remote computing device 132, the GPS antenna 126 may capture various global positioning signals from various global positioning satellites or other mechanisms. The GPS antenna 126 may communicate the captured signals to the mapping characteristics module. The mapping characteristics module may generate the route characteristics based on the signals received from the GPS antenna 126 and communicate the route characteristics to the PAC 124. For example, the PAC 124 may receive a route distance, route directions, road grade information of the route, other route characteristics, or a combination thereof. In some embodiments, the PAC 124 may receive traffic signal location information, traffic stop sign location information, posted speed limit information, lane shift information, other route characteristics or information, or a combination thereof, from the mapping characteristics module based on location information from the GPS antenna 126.

The PAC 124 may receive further vehicle parameters from the vehicle sensors 108. For example, the vehicle sensors 108 may include an energy level sensor (e.g., an energy level sensor or a battery charge sensor), an oil sensor, a speed sensor, a weight sensor, other suitable sensors, or a combination thereof. In some embodiments, the information provided by the sensors 108 may be replaced or enriched by an algorithmic method, such as an estimator. The PAC 124 may receive an energy level of the vehicle 10, a current weight of the vehicle 10, an oil condition of the vehicle 10, tire inflation information of the vehicle 10, a current vehicle speed, engine temperature information, other suitable vehicle parameters of the vehicle 10, or a combination thereof from the vehicle sensors 108. In some embodiments, the vehicle sensors 108 may include weather sensors, such as, a precipitation sensor or moisture sensor, a barometric pressure sensor, an ambient temperature sensor, other suitable sensors, or a combination thereof. The PAC 124 may receive current weather information, such as precipitation information, barometric pressure information, ambient temperature information, wind direction and magnitude information, other suitable weather information, or a combination thereof, from the vehicle sensors 108.

The PAC 124 may receive at least some of the route characteristics from the ADAS modules 128. The ADAS modules 128 may assist the driver of the vehicle 10 to improve vehicle safety and road safety. The ADAS modules 128 may be configured to automate and/or adapt and enhance vehicle systems for safety and better driving. The ADAS modules 128 may be configured to alert the driver of the vehicle 10 of upcoming traffic conditions or disabled vehicles and/or to alert the vehicle 10 of a vehicle proximate to the vehicle 10 in order to avoid collisions and accidents. Further, the ADAS modules 128 may autonomously avoid collisions by implementing safeguards and taking over control of the vehicle 10, such as, by automatic lighting, initiating adaptive cruise control (e.g., via the VPC 102) and collision avoidance (e.g., by controlling a trajectory of the vehicle 10 or bringing the vehicle 10 to a complete stop either using the VPC 102 or directly using the brake controller 112). The PAC 124 may receive information, such as traffic characteristics, vehicle proximity information, disabled vehicle information, other suitable information, or a combination thereof, from the ADAS modules 128.

The PAC 124 may receive, at least, some of the route characteristics from the V2X module communication 130. The V2X communication module 130 is configured to communicate with other systems proximate or remotely located from the vehicle 10, as described, to obtain and share information, such as, traffic information, vehicle speed information, traffic lights information, construction information, other information, or a combination thereof. The PAC 124 may receive other vehicle speed information, other vehicle location information, other traffic information, construction information, other suitable information, or a combination thereof, from the V2X communication module 130.

The PAC 124 may receive, at least, some of the route characteristics from the remote computing device 132. For example, the PAC 124 may receive further information regarding route distance, route directions, road grade information of the route, traffic information, construction information, other vehicle location information, other vehicle speed information, vehicle maintenance information of the vehicle 10, other route characteristics, or a combination thereof, from the remote computing device 132. Additionally, or alternatively, the PAC 124 may receive vehicle parameters from the remote computing device 132, such as, a make and model of the vehicle 10, manufacturer provided energy consumption efficiency of the vehicle 10, a weight of the vehicle 10, other vehicle parameters, or a combination thereof. In some embodiments, the PAC 124 may receive traffic signal location information, traffic stop sign location information, posted speed limit information, lane shift information, other route characteristics or information, or a combination thereof, from the remote computing device 132. The remote computing device 132 may include any suitable computing device or devices, such as a cloud computing device or system, a remotely located server or servers, a remotely or proximately located mobile computing device or application server that provides information to a mobile computing device, other suitable remote computing devices, or a combination thereof. The remote computing device 132 is remotely located from the vehicle 10, such as in a datacenter or other suitable location. In some embodiments, the remote computing device 132 may be located within the vehicle 10 (e.g., a mobile computing device used by the driver of the vehicle 10).

In some embodiments, the PAC 124 may receive traffic signal information, such as traffic signal phase and timing (SPaT) from a smart algorithm used by a traffic data provider. The SPaT information may indicate when traffic signals are changing and/or the timing of traffic signals.

The PAC 124 may receive route characteristics and/or vehicle parameters from the driver of the vehicle 10. For example, the driver may interact with an interface of the PAC 124, such as using the display 122 or using a mobile computing device, to provide vehicle parameters of the vehicle 10, such as, vehicle weight, vehicle make and model, vehicle age, vehicle maintenance information, vehicle identification number, a number of passengers, load information (e.g., an amount of luggage or other load information), other vehicle parameters, or a combination thereof. Additionally, or alternatively, the driver may provide route characteristics, such as a route map, route distance, other route characteristics, or a combination thereof, to the PAC 124. In some embodiments, the PAC 124 learns behavior of the driver of the vehicle 10. For example, the PAC 124 monitors the driver's vehicle speed relative to posted speed limits or whether the driver implements a vehicle speed recommendation, as will be described, provided by the PAC 124.

In some embodiments, the PAC 124 may learn traffic patterns for known routes traversed by the vehicle 10. For example, the PAC 124 may track traffic conditions while the vehicle 10 traverses one or more routes on a routine or regular basis. The PAC 124 may determine traffic patterns for the routes based on the monitored traffic conditions. In some embodiments, the PAC 124 receives traffic patterns for a route the vehicle 10 is traversing from the remote computing device 132, or from the mapping characteristics module based on the signals from the GPS antenna 126, as described.

It should be understood that the PAC 124 may receive any characteristics or information associated with routes, traffic, signage and signals, other vehicles, vehicle parameters of the vehicle 10, any other suitable characteristics or information, including those described or not described here, from any of the components described or not described herein. Additionally, or alternatively, the PAC 124 may be configured to learn any suitable characteristics or information described or not described herein.

In some embodiments, the PAC 124 is configured to control propulsion of the vehicle 10. The PAC 124 may be an integrated component of the VPC 102, or may be an overlay component that communicates with or interfaces with the VPC 102 and/or other components of the vehicle 10. Additionally, or alternatively, the PAC 124 may be disposed on a mobile computing device, such as a smart phone that uses, at least, some of the information described above, to present the driver of the vehicle 10 with a recommended vehicle speed. In some embodiments, the VPC 102 may include an adaptive cruise control mechanism. As described, the adaptive cruise control mechanism is configured to maintain the desired vehicle speed provided by the driver of the vehicle 10 using the HMI controls 104, and the adaptive cruise control mechanism is configured to maintain a safe distance between the vehicle 10 and a lead vehicle. Further, the adaptive cruise control mechanism is configured to bring the vehicle 10 to a complete stop in response to the lead vehicle coming to a complete stop. As described, the adaptive cruise control mechanism is incapable of restarting vehicle propulsion without interaction from the driver of the vehicle 10. Additionally, the adaptive cruise control mechanism is incapable of bringing the vehicle 10 to a complete stop in the absence of a lead vehicle. Accordingly, the VPC 102 (e.g., the adaptive cruise control mechanism) cannot take advantage of energy efficient vehicle propulsion control (e.g., such as a coasting to a stop in response to a determination that vehicle 10 is approaching a stop sign). The PAC 124 is configured to determine a target vehicle propulsion profile, which may include one or more target vehicle speeds and one or more target torque splits, based on an energy consumption profile for the vehicle 10. The PAC 124 may determine a target torque demand based on profiles of a target vehicle speed and/or a target torque split.

In some embodiments, the PAC 124 determines the vehicle energy consumption profile using the information described above. For example, the PAC 124 may determine the vehicle consumption profile using a vehicle weight, manufacturer provided vehicle energy efficiency, historical data corresponding to the vehicle 10 or similar vehicles indicating energy consumption of the vehicle 10 or similar vehicles while traversing portions of a particular route or specific road grades, or other suitable route or road information, other suitable vehicle parameters, or a combination thereof. The vehicle energy consumption profile may indicate that the vehicle 10 consumes a specified amount of energy (e.g., within a tolerance range) while operating at a specific vehicle speed (within a tolerance) while traversing routes having particular road, traffic, and other conditions. For example, the energy consumption of the vehicle 10 may be greater when the vehicle 10 is on an incline and may be less when the vehicle 10 is coasting to a stop. In some embodiments, the PAC 124 receives or retrieves a vehicle energy profile for the vehicle 10 determined remotely from the vehicle 10, such as by the remote computing device 132.

The PAC 124 is configured to use the vehicle energy consumption profile and various route characteristics to determine the profiles for the target vehicle speed and/or target torque split for a portion of a route being traversed by the vehicle 10. For example, the PAC 124 may determine that the vehicle 10 is approaching a particular variation in grade over the portion of the route being traversed by the vehicle 10. The PAC 124 uses the vehicle projected energy consumption profile to identify a vehicle speed (within a threshold range of the desired vehicle speed provided by the driver to the VPC 102) and/or a torque split having an optimum energy consumption for the grade variation of the portion of the route being traversed by the vehicle. In some embodiments, the PAC 124 may determine the vehicle speed and torque split using historical energy consumption for a known route, such as a route previously traversed by the vehicle 10 or similar vehicles. The PAC 124 determines a target torque demand from the identified vehicle speed and determines a target torque split from the identified torque split. It should be understood that the PAC 124 continuously monitors the various characteristics received, as described, and continues to generate profiles for target vehicle speeds and/or target torque splits, such that, the vehicle 10 maintains an optimum or improved energy consumption while maintaining driver and/or passenger comfort (e.g., by avoiding sudden, unnecessary changes in vehicle speed).

In some embodiments, the PAC 124 may be configured to determine when the vehicle 10 should coast to achieve optimum or improved energy consumption of the vehicle 10. For example, the PAC 124 may use known traffic conditions, as described, to determine when the vehicle 10 should coast. Additionally, or alternatively, the PAC 124 may learn traffic conditions, as described, and may determine whether the vehicle 10 should coast in areas along a route known to typically have traffic based, for example, on time of day. In some embodiments, the PAC 124 may use SPaT information to determine when the vehicle 10 should coast in response to change traffic signals. Additionally, or alternatively, the PAC 124 may determine to increase the target vehicle speed associated with the profile for the target vehicle speed (e.g., within the posted speed limit) in order to increase a likelihood that the vehicle 10 will arrive at a traffic signal while the traffic signal indicates to proceed, which may allow the vehicle 10 to avoid having to stop at traffic signals, based on traffic single timing.

In some embodiments, the PAC 124 may be configured to calculate a coast function and/or a road load function (see the Equation (1)) to identify particular vehicle parameters using velocity dependent resistance force. Parameters of the road load function include, vehicle parameters, such as vehicle mass or weight, vehicle rolling friction, vehicle drag coefficient, other vehicle parameters, or a combination thereof, which may be received by the PAC 124, as described. These parameters can then be updated using a coast self-learning function, such that the PAC 124 identifies or requests a coast sequence, (e.g., from historical information and/or from the remote computing device 132) and calculates the coast function result. The PAC 124 may calculate the coast function when requested by the driver of the vehicle 10 who would be prompted to perform a particular learning maneuver by the PAC 124, or could be learned in the background.

Equation (1) Velocity dependent resistive forces: F=wind, tires, bearings, and other forces plus acceleration dependent inertial forces plus grade dependent gravitational forces:

$$F=(A+(B*v)+(C*v^2))+((1+\text{drive axle \%}+\text{non-drive axle \%})*(\text{Test Mass}*\text{acceleration}))+(\text{Test Mass}*g*\sin(\arctan(\text{grade \%})))$$

Where A represents the resistive force that is constant and does not vary with velocity (e.g., bearings, seals, tires, etc.), B represents the resistive force that varies linearly with velocity (e.g., drive train, differential, etc.), and C represents the resistive force that varies with the square of velocity (e.g., wind, tire deformation, etc.)

As described, the PAC 124 may control or interface with the VPC 102 and/or interface with the driver of the vehicle 10 in order to achieve the target vehicle speed and/or target torque split profiles, which may result in optimum or improved energy consumption efficiency of the vehicle 10. Additionally, or alternatively, the PAC 124 may control or interface with the VPC 102 in order to bring the vehicle 10 to a complete stop in response to the vehicle 10 approaching a stop sign, traffic signal, traffic, disabled vehicle, or other suitable conditions. The PAC 124 may also control or interface with the VPC 102 in order to resume vehicle propulsion after the vehicle 10 has come to a complete stop.

In some embodiments, the PAC 124 may control or interface with the VPC 102 using virtual inputs in order to achieve the target vehicle speed and/or target torque split profiles. As described, the VPC 102 may receive a desired vehicle speed from the driver of the vehicle 10 using the HMI controls 104. Virtual inputs as described herein may include inputs generated by the PAC 124 or other suitable component disposed within the vehicle 10 or remotely located from the vehicle 10 that cause allow the PAC 124 or other suitable component to control aspects of the vehicle 10 according to one or more control targets or other targets, such as those described herein. Additionally, or alternatively, the VPC 102 (e.g., when the VPC 102 includes an adaptive cruise control mechanism) may adjust the desired vehicle speed in response to a lead vehicle's speed.

In some embodiments, the PAC 124 initializes the VPC 102 using the desired speed provided by the driver of the vehicle 10 the first time the driver of the vehicle 10 engages the VPC 102 during a key cycle. The PAC 124 may then provide the virtual inputs to the VPC 102 in order to control vehicle speed to achieve optimum or improved energy consumption efficiency of the vehicle 10. In some embodiments, the PAC 124 may generate a virtual input that includes a virtual HMI signal that, when received by the VPC 102, may cause the VPC 102 to be enabled, be disabled, and/or to set or adjust the current vehicle speed. The PAC 124 generates the virtual HMI signal based on target vehicle speed profile. The PAC 124 is in communication with and/or interfaces with the HMI controls 104. The PAC 124 substitutes HMI signals provided by the driver of the vehicle 10 with the virtual HMI signal generated by the PAC 124. The VPC 102, as described, includes a plurality of safety controls. The VPC 102 then applies the target vehicle speed associated with the target vehicle speed profile indicated by the virtual HMI signal, in the same manner the VPC 102 applies a desired vehicle speed provided by the driver using the HMI controls 104, as described. The VPC 102 may determine whether to apply the target vehicle speed and/or the target torque split indicated by the virtual HMI signals based on the safety controls.

In some embodiments, the PAC 124 generates a virtual input that includes a virtual lead car in order to control the VPC 102 to bring the vehicle 10 to a complete stop in the absence of an actual lead car. For example, the PAC 124 may bring the vehicle 10 to a stop as the vehicle 10 approaches a stop sign, a traffic signal, traffic, a disabled vehicle, or other suitable stopping conditions that the vehicle 10 may encounter, as described. The PAC 124 substitutes information received by the VPC 102 from the vehicle sensors 108 (e.g., information the VPC 102 uses to detect an actual lead car) with virtual information, signals, and/or inputs corresponding to the virtual lead car.

The VPC 102 detects the presence of the virtual lead car and performs operations associated with following a lead car (e.g., maintain a safe distance between the vehicle 10 and the lead car, keeping pace with the lead car, and bringing the vehicle to a stop in response to the lead car being within an object range of the vehicle 10 and coming to a complete stop). The PAC 124 may then control a virtual speed of the virtual lead car based on the target vehicle speed profile. The VPC 102 may then adjust the current vehicle speed of the vehicle 10 to follow the virtual lead car. In this manner, the PAC 124 may achieve the target vehicle speed profile of the vehicle 10 to provide optimum or improved energy consumption efficiency of the vehicle 10. While the PAC 124 is controlling the VPC 102 using the virtual inputs described, the vehicle sensors 108, such as cameras, radar, proximity sensors, and the like, continue to provide information to the VPC 102, such that, while the VPC 102 is applying or following the virtual inputs provided by the PAC 124, the VPC 102 may continue to detect actual vehicles or objects in front of the vehicle 10. The safety controls of the VPC 102 are configured to override the VPC 102, including the virtual inputs provided by the PAC 124, to safely bring the vehicle 10 to a complete stop or increase or decrease vehicle speed in response to the information from the vehicle sensors 108

In some embodiments, the PAC 124 may be in direct communication with the VPC 102 and the torque split controller 116 to provide recommended target torque demands and target torque splits to the VPC 102 and the torque split controller 116, respectively, to achieve an optimum or improved energy consumption efficiency of the vehicle 10. For example, the VPC 102 may be configured to receive HMI signals (e.g., as described), to follow a lead vehicle based on information from the vehicle sensors 108 (e.g., as described), and to receive a recommended target vehicle speed signal from the PAC 124. The VPC 102 may determine whether to apply the target vehicle speed indicated by the recommended target vehicle speed signal, for example, based on the driver input, the detection of a lead vehicle, and/or the safety controls of the VPC 102.

The torque split controller 116 may be configured to receive a recommended torque split signal from the VPC 102 based on the driver input, as described, and may be configured to receive a recommended target torque split signal from the PAC 124. It should be understood that the PAC 124 may communicate the recommended target torque split signal to the VPC 102, which then may communicate the recommended target torque split signal and/or the recommended torque demand signal (e.g., generated by the VPC 102) to the torque split controller 116. The torque split controller 116 determines whether to apply the target torque split indicated by the recommended target toque split signal based on a comparison to the torque split indicated by the recommended torque split signal provided by the VPC 102 and/or based on an existing propulsion state of the vehicle 10 (e.g., including diagnostic conditions).

In some embodiments, the PAC 124 may communicate with the display 122 to provide an indicator to the driver that the vehicle speed is changing in order to improve energy consumption efficiency of the vehicle 10. For example, the PAC 124 may use the display 122 to illustrate an energy efficiency symbol that indicates to the driver of the vehicle 10 that the vehicle speed is changing in order to improve energy consumption efficiency of the vehicle 10.

In some embodiments, as described, the VPC 102 may not include an adaptive cruise control system and may include a basic cruise control system. Additionally, or alternatively, the driver of the vehicle 10 may not engage the VPC 102 in order to control propulsion of the vehicle 10 (e.g., the driver of the vehicle 10 may control propulsion manually). Accordingly, the PAC 124 is configured to provide a recommendation to the driver indicating a target vehicle speed of a target vehicle speed profile. The recommendation may be provided to the driver of the vehicle 10 using one or more integrated displays of the vehicle 10, such as the display 122 which may include a portion of a dash or console of the vehicle 10, a navigation display of the vehicle 10, or other suitable integrated displays of the vehicle 10. In some embodiments, the recommendation may be provided to the driver of the vehicle 10 using a mobile computing device within the vehicle 10. The recommendation may include a symbol or textual information that indicates to the driver of the vehicle 10 to increase or decrease vehicle speed. Additionally, or alternatively, the recommendation can include a coast recommendation that is displayed for a calibratable amount of time and is then withdrawn in response to the driver of the vehicle 10 ignoring the recommendation. The recommendation can include information indicating that the recommendation is in response to a change in speed limit, a stop sign being approached by the vehicle 10, traffic signal timing, and status, or other information. The information may be visually displayed and may decay as the vehicle 10 recommendation becomes obsolete.

The driver of the vehicle 10 may determine to honor the recommendation and change the vehicle speed accordingly, or the driver may choose to ignore the recommendation. The PAC 124 may be configured to monitor drive action in response to the recommendation to determine whether the driver of the vehicle 10 honored the recommendation or ignored the recommendation. The PAC 124 may determine whether to adjust recommendations based on the monitored driver action. For example, the PAC 124 may determine not to recommend coasting in response to the driver ignoring a threshold number of coasting recommendations. Additionally, or alternatively, the PAC 124 may determine, using the monitored driver action and the route traversed by the vehicle 10, whether the driver of the vehicle 10 honors the recommendation at certain portions of the route and ignores the recommendations at other portions of the route. The PAC 124 may selectively provide the recommendations to the driver of the vehicle 10 based on the monitored driver action and the vehicle route. Additionally, or alternatively, the PAC 124 may monitor the driver action in response to the recommendation based on traffic patterns, stop signs, traffic signals, and the like. The PAC 124 may selectively determine whether to provide the driver of the vehicle 10 the recommendations based on the monitored driver action in response to traffic patterns, stop signs, traffic signals, and the like.

In some embodiments, the PAC 124 may identify, using a projected cumulative net energy consumption of the vehicle 10, one or more route segments of the route being traversed by the vehicle 10. It should be understood that, as used herein, the term "being traversed by the vehicle" includes a period before the vehicle initiates traversal of the route, a period while the vehicle is traversing the route, and a period that includes a completion of the vehicle traversing the route. Each route segment of the one or more route segments may include a substantially equal segment length and/or at least some of the route segments may include a segment length that is different from at least one other route segment of the one or more route segments. It should be understood that the route segments may include any suitable length, including the same or substantially the same length, a combination of the same or substantially the same length (e.g., for some of the route segments) and at least one other segment length (e.g., for other route segments), a plurality of different segment lengths (e.g., for some or all of the route segments), or any suitable combination of segment lengths.

The projected cumulative net energy consumption of the vehicle 10 may include a kinetic energy aspect and a potential energy aspect. The PAC 124 may determine the kinetic energy aspect of the projected cumulative net energy consumption of the vehicle 10 based on one or more speed limits associated with the route being traversed by the vehicle 10 and/or other suitable information associated with the vehicle 10 and/or the route. The PAC 124 may determine the potential energy aspect of the projected cumulative net energy consumption of the vehicle 10 based on one or more route elevations associated with the route being traversed by the vehicle 10 and/or other suitable information associated with the vehicle 10 and/or the route.

The PAC 124 may determine, for each route segment of the one or more route segments, a vehicle energy consumption profile, as described. The PAC 124 may determine, for each of the one or more route segments, a profile for a target vehicle speed based on at least one route characteristic and a corresponding vehicle energy consumption profile, as described.

In some embodiments, PAC 124 may determine, for each route segment of the one or more route segments, a projected SOC profile for at least one battery of the vehicle 10 based on at least one SOC calibration parameter. The at least one SOC calibration parameter may include at least one of one or more vehicle speed limit change locations associated with the route being traversed by the vehicle, one or more traffic signal locations associated with the route being traversed by the vehicle, one or more stop sign locations associated with the route being traversed by the vehicle, a weight parameter associated energy consumption associated with the route being traversed by the vehicle and a travel time associated with the route being traversed by the vehicle, one or more road grades associated with the route being traversed by the vehicle, a vehicle mass associated with the vehicle, and a battery size associated with the at least one battery of the vehicle, other suitable SOC calibration parameters, or a combination thereof.

The PAC 124, for a respective route segment of the one or more route segments, generate one or more torque commands based on at least the target vehicle speed profile and/or the SOC profile corresponding to the respective route segment. The PAC 124 may selectively control propulsion of the vehicle 10 based on the one or more torque commands to achieve the target vehicle speed profile.

In some embodiments, the PAC 124 and/or the VPC 102 may perform the methods described herein. However, the methods described herein as performed by the PAC 124 and/or the VPC 102 are not meant to be limiting, and any type of software executed on a controller can perform the methods described herein without departing from the scope of this disclosure. For example, a controller, such as a processor executing software within a computing device onboard the vehicle 10, can perform the methods described herein.

Figure 3:
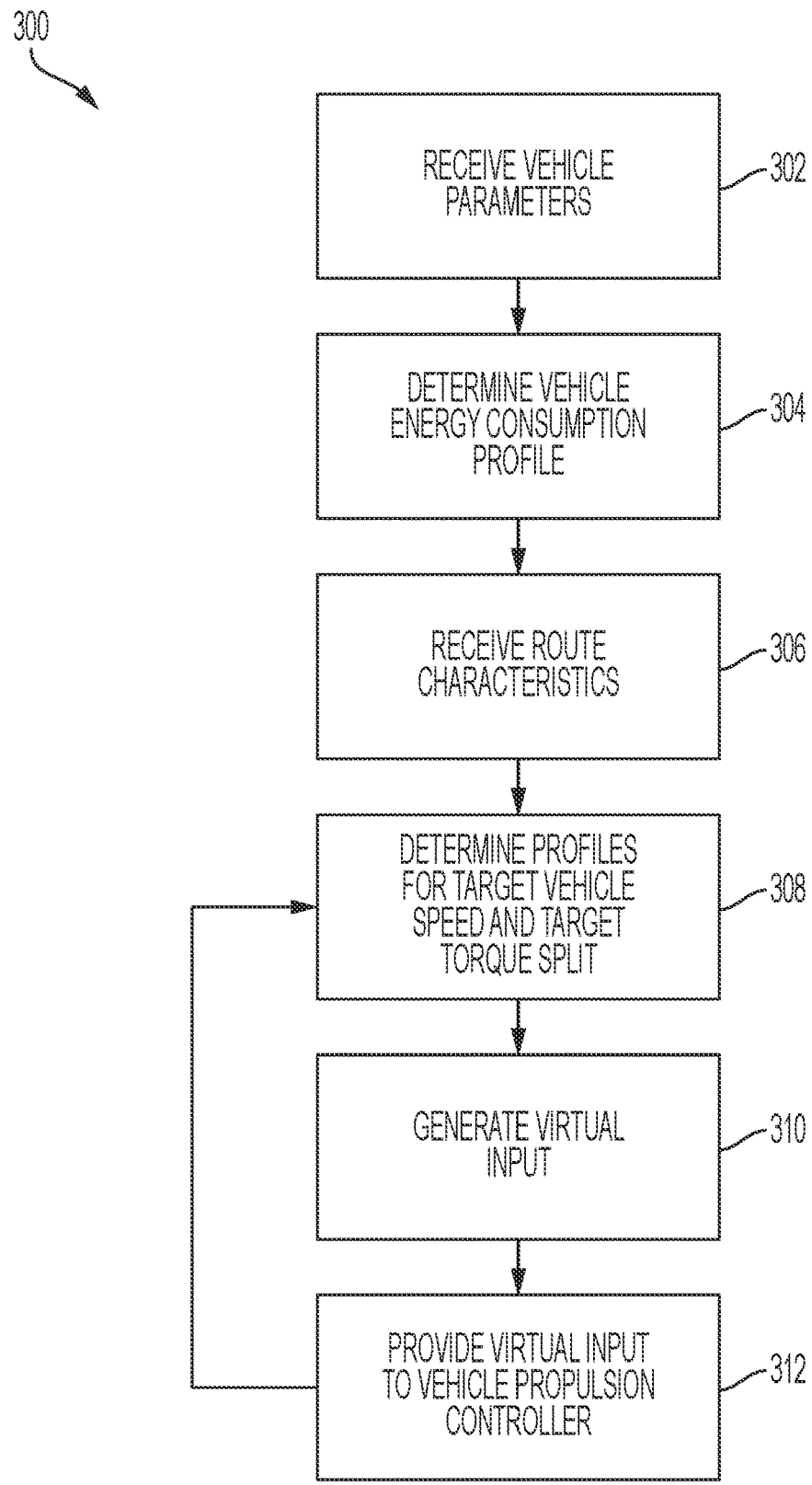
FIG. 3 is a flow diagram generally illustrating a vehicle propulsion control method according to the principles of the present disclosure.

FIG. 3 is a flow diagram generally illustrating a vehicle propulsion control method 300 according to the principles of the present disclosure. At 302, the method 300 receives vehicle parameters. As described, the PAC 124 may receive various vehicle parameters of the vehicle 10 from any of the components described herein. At 304, the method 300 determines a vehicle energy consumption profile. As described, the PAC 124 determines the energy consumption profile for the vehicle 10 using the vehicle parameters and/or other route characteristics, such as historical route characteristics associated with routes previously traversed by the vehicle, route characteristics associated with routes previously traversed by similar vehicles (e.g., from the remote computing device 132 and/or the V2X communication module 130, other suitable route characteristics, or a combination thereof. At 306, the method 300 receives route characteristics. As described, the PAC 124 receives various route characteristics (e.g., route characteristics for a route the vehicle 10 is either currently traversing or will traverse) and other information from any other components described herein. In some embodiments, the method continues at 308. In some embodiments, the method continues at 310. At 308, the method 300 determines profiles for a target vehicle speed and/or a target toque split. As described, the PAC 124 determines profiles for a target vehicle speed and/or a target torque split based on the vehicle parameters, the route characteristics, the energy consumption profile of the vehicle 10, other information received, as described, from the various components described herein. The profiles of the target vehicle speed and/or target vehicle torque split correspond to a vehicle speed and/or a torque split that, when achieved by the vehicle 10, provide an optimum, or improved energy consumption efficiency of the vehicle 10.

At 310, the method 300 generates at least one virtual input. As described, the PAC 124 generates at least one virtual input. The virtual input may include a virtual HMI signal and/or a virtual lead vehicle. The virtual input, when applied by the VPC 102, achieves the target vehicle speed and/or the target torque split. At 312, the method 300 provides the virtual input to the vehicle propulsion controller. As described, the PAC 124 may substitute HMI signals communicated from the HMI controls 104 based on input from the driver of the vehicle 10 with the virtual HMI signals. Additionally, or alternatively, the PAC 124 may substitute vehicle sensor information provided by the vehicle sensors 108 to indicate the virtual lead vehicle to the VPC 102. As described, the VPC 102 may apply the virtual HMI signals and/or may follow the virtual lead vehicle in order to achieve the target vehicle speed and/or torque split. As described, the PAC 124 may continuously update the target vehicle speed and/or target torque split as the vehicle 10 continues to traverse the route and based on updated traffic information, vehicle information, route information, other information, or a combination thereof.

Figure 4:
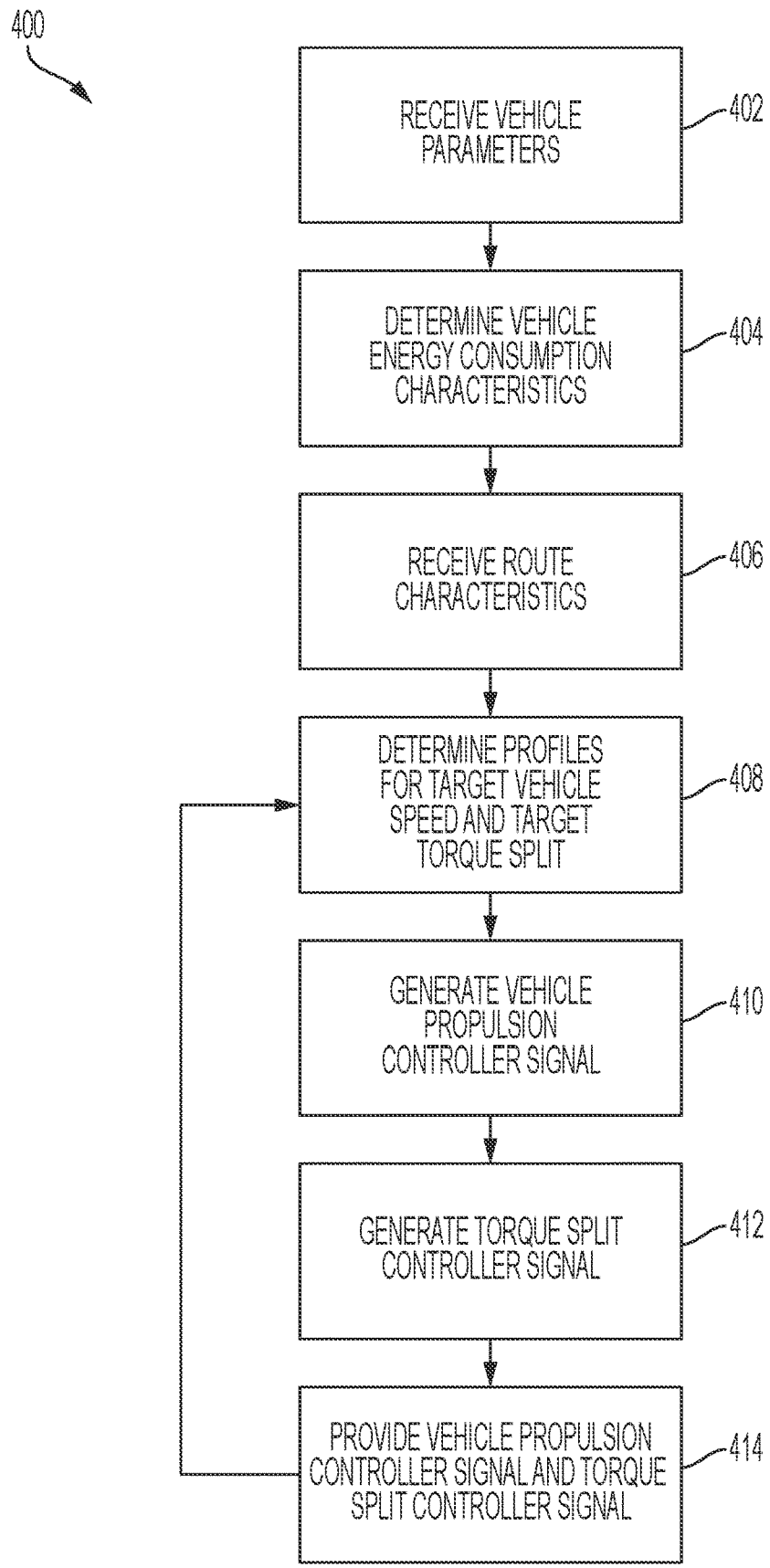
FIG. 4 is a flow diagram generally illustrating an alternative vehicle propulsion control method according to the principles of the present disclosure.

FIG. 4 is a flow diagram generally illustrating an alternative vehicle propulsion control method 400 according to the principles of the present disclosure. At 402, the method 400 receives vehicle parameters. As described, the PAC 124 may receive various vehicle parameters of the vehicle 10 from any of the components described herein. At 404, the method 400 determines a vehicle energy consumption profile. As described, the PAC 124 determines the energy consumption profile for the vehicle 10 using the vehicle parameters and/or other route characteristics, such as historical route characteristics associated with routes previously traversed by the vehicle, route characteristics associated with routes previously traversed by similar vehicles (e.g., from the remote computing device 132 and/or the V2X communication module 130, other suitable route characteristics, or a combination thereof. At 406, the method 400 receives route characteristics. As described, the PAC 124 receives various route characteristics (e.g., route characteristics for a route the vehicle 10 is either currently traversing or will traverse) and other information from any other components described herein. In some embodiments, the method continues at 408. In some embodiments, the method continues at 410. At 408, the method 400 determines profiles for a target vehicle speed and/or a target toque split. As described, the PAC 124 determines profiles for a target vehicle speed and/or a target torque split based on the vehicle parameters, the route characteristics, the energy consumption profile of the vehicle 10, other information received, as described, from the various components described herein. The profiles for the target vehicle speed and/or target vehicle torque split correspond to a vehicle speed and/or a torque split that, when achieved by the vehicle 10, provide an optimum, or improved energy consumption efficiency of the vehicle 10.

At 410, the method 400 generates a vehicle propulsion controller signal. As described, the PAC 124 is in direct communication with the VPC 102 and may provide signals as an input to the VPC 102. The PAC 124 generates the vehicle propulsion controller signal based on the target vehicle speed. The vehicle propulsion controller signal may be referred to as a recommended target vehicle speed. At 412, the method 400 generates a torque split controller signal. As described, the PAC 124 may be in direct communication with the torque split controller 116 and may provide signals as inputs to the torque split controller 116. The PAC 124 generates the torque split controller signal based on the target torque split. The torque split controller signal may be referred to as a recommended target torque split. At 414, the method 400 provides the vehicle propulsion controller signal and the torque split controller signal. As described, the PAC 124 may provide the vehicle propulsion controller signal to the VPC 102. The VPC 102 may determine whether to apply the target vehicle speed indicated by the vehicle propulsion controller signal, as described. The PAC 124 may provide the torque split controller signal to the torque split controller 116 or may provide the torque split controller signal to the VPC 102, which then may provide the torque split signal to the torque split controller 116. The torque split controller 116 may then determine whether to apply the torque split indicated by the torque split controller signal, as described. The vehicle propulsion controller signal and torque split controller signal correspond to a vehicle speed and/or a torque split that, when achieved by the vehicle 10, provide an optimum, or improved energy consumption efficiency of the vehicle 10. As described, the PAC 124 may continuously update the target vehicle speed and/or target torque split as the vehicle 10 continues to traverse the route and based on updated traffic information, vehicle information, route information, other information, or a combination thereof.

Figure 5:
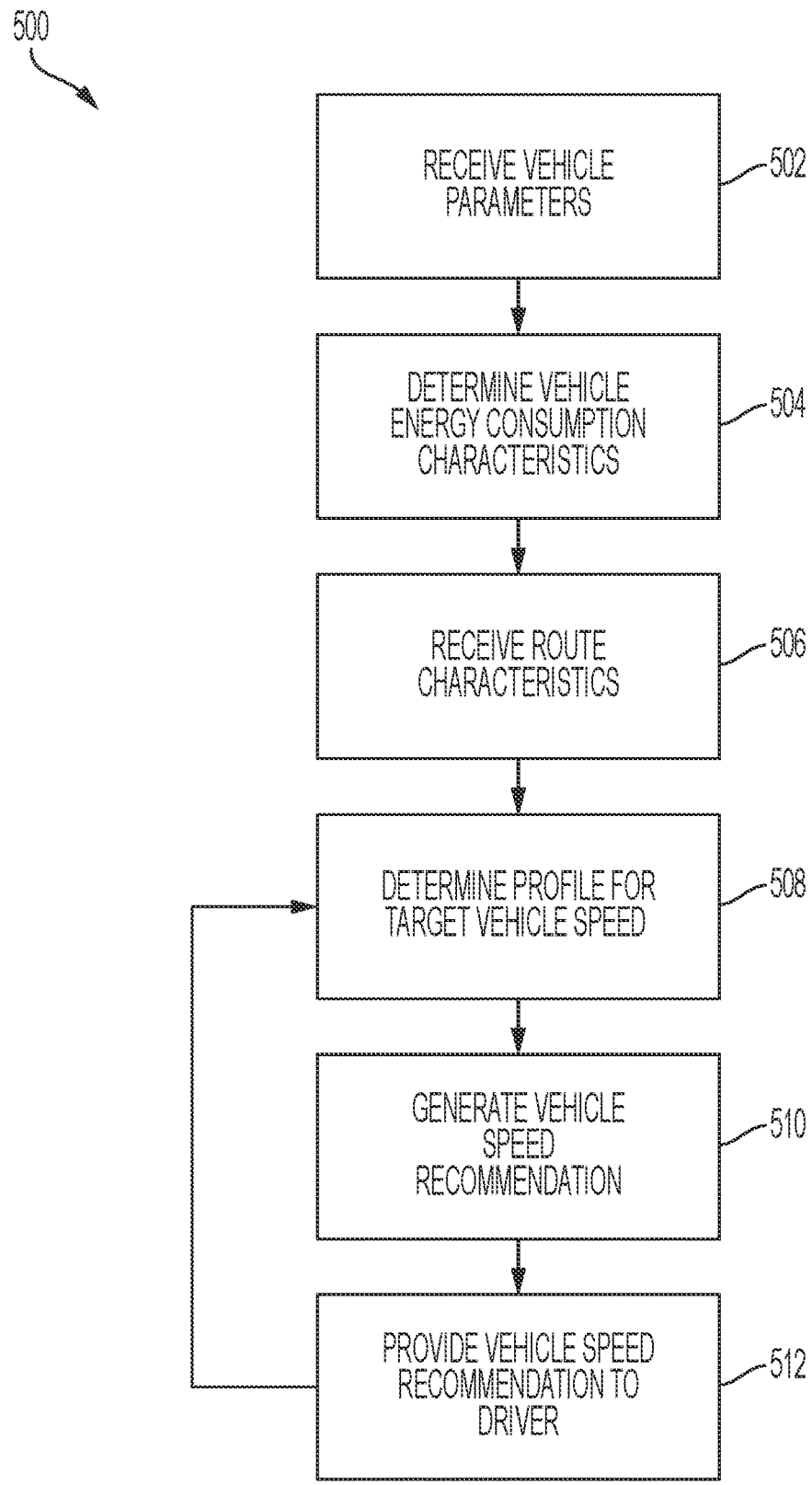
FIG. 5 is a flow diagram generally illustrating an alternative vehicle propulsion control method according to the principles of the present disclosure.

FIG. 5 is a flow diagram generally illustrating an alternative vehicle propulsion control method 500 according to the principles of the present disclosure. At 502, the method 500 receives vehicle parameters. As described, the PAC 124 may receive various vehicle parameters of the vehicle 10 from any of the components described herein. At 504, the method 500 determines a vehicle energy consumption profile. As described, the PAC 124 determines the energy consumption profile for the vehicle 10 using the vehicle parameters and/or other route characteristics, such as historical route characteristics associated with routes previously traversed by the vehicle, route characteristics associated with routes previously traversed by similar vehicles (e.g., from the remote computing device 132 and/or the V2X communication module 130, other suitable route characteristics, or a combination thereof. At 506, the method 500 receives route characteristics. As described, the PAC 124 receives various route characteristics (e.g., route characteristics for a route the vehicle 10 is either currently traversing or will traverse) and other information from any other components described herein. In some embodiments, the method continues at 508. In some embodiments, the method continues at 510. At 508, the method 500 determines profiles for a target vehicle speed. As described, the PAC 124 determines a profile for a target vehicle speed based on the vehicle parameters, the route characteristics, the energy consumption profile of the vehicle 10, other information received, as described, from the various components described herein. The profile for the target vehicle speed corresponds to a vehicle speed that, when achieved by the vehicle 10, provide an optimum or improved energy consumption efficiency of the vehicle 10.

At 510, the method 500 generates a vehicle speed recommendation. For example, the PAC 124 generates a vehicle speed recommendation based on the profile of the target vehicle speed. At 512, the method 500 provides the vehicle speed recommendation to the driver. As described, the PAC 124 may provide the vehicle speed recommendation to the driver of the vehicle 10 using the display 122, a mobile computing device, or other suitable devices or displays capable of providing the vehicle speed recommendation to the driver of the vehicle 10. As described, the driver of the vehicle 10 may honor the vehicle speed recommendation or ignore the vehicle speed recommendation. The vehicle speed recommendation corresponds to a vehicle speed, when achieved by the vehicle 10, provide an optimum, or improved energy consumption efficiency of the vehicle 10. As described, the PAC 124 may continuously update the profile of the target vehicle speed split as the vehicle 10 continues to traverse the route and based on updated traffic information, vehicle information, route information, other information, or a combination thereof.

Figure 6:
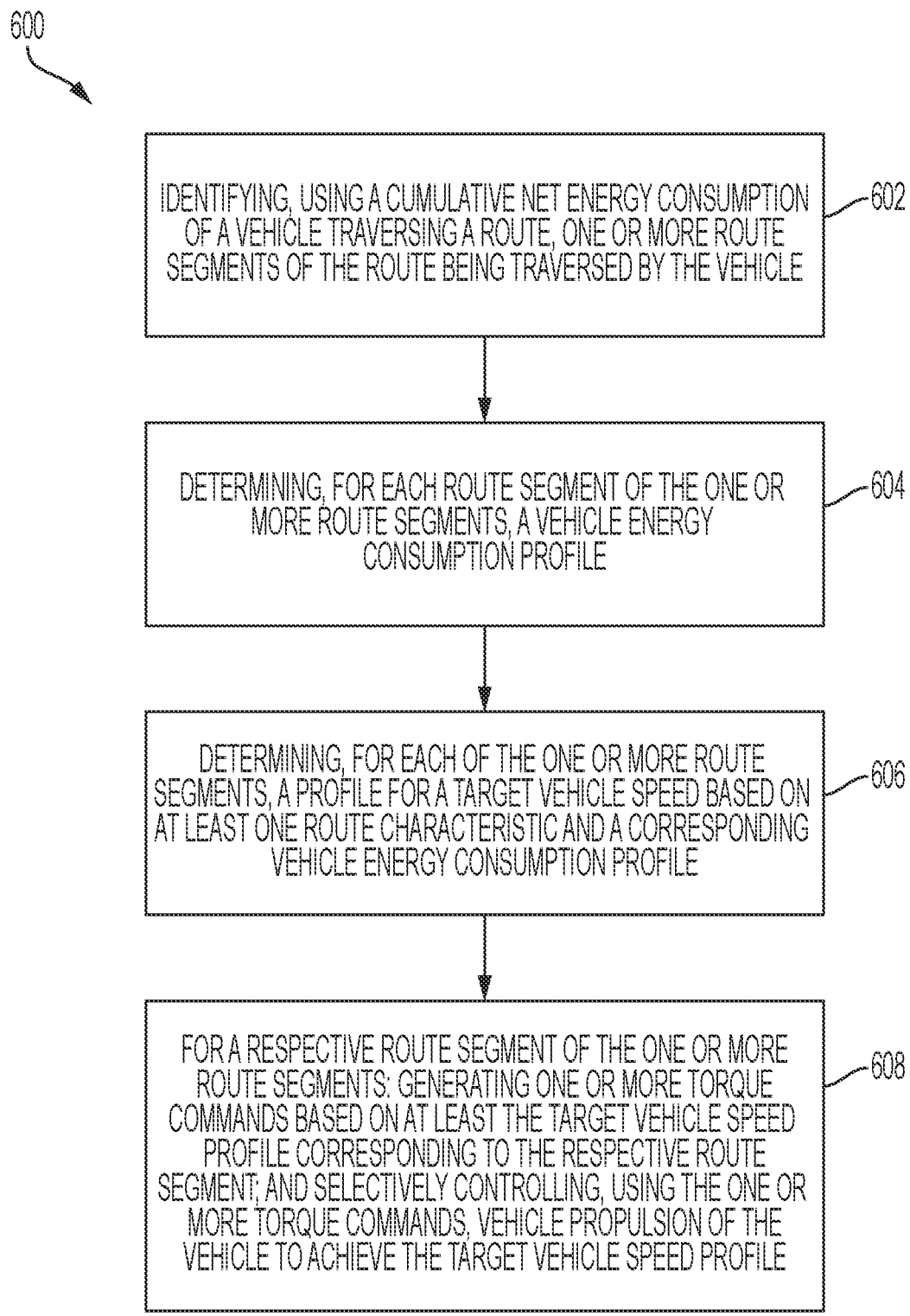
FIG. 6 is a flow diagram generally illustrating an alternative vehicle propulsion control method according to the principles of the present disclosure.

FIG. 6 is a flow diagram generally illustrating an alternative vehicle propulsion control method 600 according to the principles of the present disclosure. At 602, the method 600 identifies, using a projected cumulative net energy consumption of a vehicle traversing a route, one or more route segments of the route being traversed by the vehicle. For example, the PAC 124 may identify, using the projected cumulative net energy consumption of a vehicle 10, while the vehicle 10 traverses a route (e.g., including before the vehicle 10 initiates traversal of the route), one or more route segments of the route.

At 604, the method 600 determines, for each route segment of the one or more route segments, a vehicle energy consumption profile. For example, the PAC 124 may determine, for each route segment of the one or more route segments, the vehicle energy consumption profiles.

At 606, the method 600 determines, for each of the one or more route segments, a profile for a target vehicle speed based on at least one route characteristic and a corresponding vehicle energy consumption profile. For example, the PAC 14 may determine, for each of the one or more route segments, a profile for a target vehicle speed based on at least one route characteristic and a corresponding vehicle energy consumption profile. In some embodiments, the method 600 may determine, for each route segment of the one or more route segments, a state of charge profile for at least one battery of the vehicle based on at least one state of charge parameter. For example, the PAC 124 may determine, for each route segment of the one or more route segments, a state of charge profile for at least one battery of the vehicle 10 based on at least one state of charge parameter.

At 608, the method 600, for a respective route segment of the one or more route segments, generates one or more torque commands based on at least the target vehicle speed profile, and/or the state of charge profile corresponding to the respective route segment. For example, the PAC 124 may generate one or more torque commands based on at least the target vehicle speed profile, and/or the state of charge profile corresponding to the respective route segment. The method 600 may selectively control, using the one or more torque commands, vehicle propulsion of the vehicle to achieve the target vehicle speed profile. For example, the PAC 124 may selectively control using the one or more torque commands, vehicle propulsion of the vehicle 10 to achieve the target vehicle speed profile.

Clause 1. A method for controlling vehicle energy consumption, the method comprising: identifying, using a projected cumulative net energy consumption of a vehicle traversing a route, one or more route segments of the route being traversed by the vehicle; determining, for each route segment of the one or more route segments, a vehicle energy consumption profile; determining, for each of the one or more route segments, a profile for a target vehicle speed based on at least one route characteristic and a corresponding vehicle energy consumption profile; for a respective route segment of the one or more route segments: generating one or more torque commands based on at least the target vehicle speed profile corresponding to the respective route segment; and selectively controlling, using the one or more torque commands, vehicle propulsion of the vehicle to achieve the target vehicle speed profile.

Clause 2. The method of clause 1, further comprising determining, for each route segment of the one or more route segments, a state of charge profile for at least one battery of the vehicle based on at least one state of charge parameter.

Clause 3. The method of clause 2, wherein, generating the one or more torque commands for the respective route segment of the one or more route segments is further based on a state of charge profile corresponding to the respective route segment of the one or more route segments.

Clause 4. The method of clause 2, wherein the at least one state of charge parameter includes at least one of one or more vehicle speed limit change locations associated with the route being traversed by the vehicle, one or more traffic signal locations associated with the route being traversed by the vehicle, one or more stop sign locations associated with the route being traversed by the vehicle, a weight parameter associated energy consumption associated with the route being traversed by the vehicle and a travel time associated with the route being traversed by the vehicle, one or more road grades associated with the route being traversed by the vehicle, a vehicle mass associated with the vehicle, and a battery size associated with the at least one battery of the vehicle.

Clause 5. The method of clause 1, wherein the projected cumulative net energy consumption of the vehicle includes a kinetic energy aspect and a potential energy aspect.

Clause 6. The method of clause 5, further comprising determining the projected kinetic energy aspect of the projected cumulative net energy consumption of the vehicle based on one or more speed limits associated with the route being traversed by the vehicle.

Clause 7. The method of clause 5, further comprising determining the potential energy aspect of the cumulative net energy consumption of the vehicle based on one or more route elevations associated with the route being traversed by the vehicle.

Clause 8. The method of clause 1, wherein each route segment of the one or more route segments includes a substantially equal segment length.

Clause 9. The method of clause 1, wherein at least one route segment of the one or more route segments includes a segment length that is different from at least one other route segment of the one or more route segments.

Clause 10. A system for controlling vehicle energy consumption, the system comprising: a processor; and a memory including instructions that, when executed by the processor, cause the processor to: identify, using a rolling buffer corresponding to a projected cumulative net energy consumption of a vehicle traversing a route, one or more route segments of the route being traversed by the vehicle; determine, for each route segment of the one or more route segments, a vehicle energy consumption profile; determine, for each of the one or more route segments, a profile for a target vehicle speed based on at least one route characteristic and a corresponding vehicle energy consumption profile; for a respective route segment of the one or more route segments: generate one or more torque commands based on at least the target vehicle speed profile corresponding to the respective route segment; and selectively control, using the one or more torque commands, vehicle propulsion of the vehicle to achieve the target vehicle speed profile.

Clause 11. The system of clause 10, wherein the instructions further cause the processor to determine, for each route segment of the one or more route segments, a state of charge profile for at least one battery of the vehicle based on at least one state of charge parameter.

Clause 12. The system of clause 11, wherein the instructions further cause the processor to, generate the one or more torque commands for the respective route segment of the one or more route segments further based on a state of charge profile corresponding to the respective route segment of the one or more route segments.

Clause 13. The system of clause 11, wherein the at least one state of charge parameter includes at least one of one or more vehicle speed limit change locations associated with the route being traversed by the vehicle, one or more traffic signal locations associated with the route being traversed by the vehicle, one or more stop sign locations associated with the route being traversed by the vehicle, a weight parameter associated energy consumption associated with the route being traversed by the vehicle and a travel time associated with the route being traversed by the vehicle, one or more road grades associated with the route being traversed by the vehicle, a vehicle mass associated with the vehicle, and a battery size associated with the at least one battery of the vehicle.

Clause 14. The system of clause 10, wherein the projected cumulative net energy consumption of the vehicle includes a projected kinetic energy aspect and a potential energy aspect.

Clause 15. The system of clause 14, wherein the instructions further cause the processor to determine the projected kinetic energy aspect of the projected cumulative net energy consumption of the vehicle based on one or more speed limits associated with the route being traversed by the vehicle.

Clause 16. The system of clause 14, wherein the instructions further cause the processor to determine the potential energy aspect of the projected cumulative net energy consumption of the vehicle based on one or more route elevations associated with the route being traversed by the vehicle.

Clause 17. The system of clause 10, wherein each route segment of the one or more route segments includes a substantially equal segment length.

Clause 18. The system of clause 10, wherein at least one route segment of the one or more route segments includes a segment length that is different from at least one other route segment of the one or more route segments.

Clause 19. An apparatus for controlling vehicle energy consumption, the apparatus comprising: a processor; and a memory including instructions that, when executed by the processor, cause the processor to: identify, using a rolling buffer corresponding to a projected cumulative net energy consumption of a vehicle traversing a route, one or more route segments of the route being traversed by the vehicle; determine, for each route segment of the one or more route segments, a vehicle energy consumption profile; determine, for each of the one or more route segments, a profile for a target vehicle speed based on at least one route characteristic and a corresponding vehicle energy consumption profile; determine, for each route segment of the one or more route segments, a state of charge profile for at least one battery of the vehicle based on at least one state of charge parameter; for a respective route segment of the one or more route segments: generate one or more torque commands based on at least the target vehicle speed profile and a state of charge profile corresponding to the respective route segment; and selectively control, using the one or more torque commands, vehicle propulsion of the vehicle to achieve the target vehicle speed profile.

Clause 20. The apparatus of clause 19, wherein the at least one state of charge parameter includes at least one of one or more vehicle speed limit change locations associated with the route being traversed by the vehicle, one or more traffic signal locations associated with the route being traversed by the vehicle, one or more stop sign locations associated with the route being traversed by the vehicle, a weight parameter associated energy consumption associated with the route being traversed by the vehicle and a travel time associated with the route being traversed by the vehicle, one or more road grades associated with the route being traversed by the vehicle, a vehicle mass associated with the vehicle, and a battery size associated with the at least one battery of the vehicle.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for controlling vehicle energy consumption, the method comprising:
   identifying, using a cumulative net energy consumption of a vehicle traversing a route, one or more route segments of the route being traversed by the vehicle, wherein the cumulative net energy consumption of the vehicle includes a kinetic energy aspect determined based on one or more posted speed limits associated with the route being traversed by the vehicle;
   determining, using a learned heuristic developed based on data associated with historic operation of the vehicle, a length for each route segments of the one or more route segments, wherein the historic operation of the vehicle corresponds to operation of the vehicle along at least one route having at least one route characteristic in common with the route being traversed by the vehicle;
   determining, for each route segment of the one or more route segments, a vehicle energy consumption profile, wherein the vehicle energy consumption profile is determined based on at least historical data associated with at least one other vehicle for at least a portion of a route previously traversed by the at least one other vehicle having at least one route characteristic corresponding to at least one route characteristic of the route being traversed by the vehicle;
   determining, for each of the one or more route segments, a profile for a target vehicle speed based on at least one route characteristic and a corresponding vehicle energy consumption profile;
   determining, for each of the one or more route segments, a state of charge profile for at least one battery of the vehicle, wherein the state of charge profile includes at least one state of charge bound;
   for a respective route segment of the one or more route segments:
      generating one or more torque commands based on at least the target vehicle speed profile corresponding to the respective route segment; and
      selectively controlling, using the one or more torque commands and the at least one state of charge bound corresponding to the respective route segment, vehicle propulsion of the vehicle to achieve the target vehicle speed profile.

2. The method of claim 1, wherein the state of charge profile for the at least one battery of the vehicle is based on at least one state of charge parameter.

3. The method of claim 2, wherein, generating the one or more torque commands for the respective route segment of the one or more route segments is further based on a state of charge profile corresponding to the respective route segment of the one or more route segments.

4. The method of claim 2, wherein the at least one state of charge parameter includes at least one of one or more vehicle speed limit change locations associated with the route being traversed by the vehicle, one or more traffic signal locations associated with the route being traversed by the vehicle, one or more stop sign locations associated with the route being traversed by the vehicle, a weight parameter associated energy consumption associated with the route being traversed by the vehicle and a travel time associated with the route being traversed by the vehicle, one or more road grades associated with the route being traversed by the vehicle, a vehicle mass associated with the vehicle, and a battery size associated with the at least one battery of the vehicle.

5. The method of claim 1, wherein the cumulative net energy consumption of the vehicle further includes a potential energy aspect.

6. The method of claim 5, further comprising receiving posted speed limit information associated with the route being traversed by the vehicle and determining the kinetic energy aspect of the cumulative net energy consumption of the vehicle based on the received posted speed limit information associated with the route being traversed by the vehicle.

7. The method of claim 5, further comprising determining the potential energy aspect of the cumulative net energy consumption of the vehicle based on one or more route elevations associated with the route being traversed by the vehicle.

8. The method of claim 1, wherein each route segment of the one or more route segments includes a substantially equal segment length.

9. The method of claim 1, wherein at least one route segment of the one or more route segments includes a segment length that is different from at least one other route segment of the one or more route segments.

10. A system for controlling vehicle energy consumption, the system comprising:
a processor; and
a memory including instructions that, when executed by the processor, cause the processor to:
identify, using a rolling buffer corresponding to a cumulative net energy consumption of a vehicle traversing a route, one or more route segments of the route being traversed by the vehicle, wherein the cumulative net energy consumption of the vehicle includes a kinetic energy aspect determined based on one or more posted speed limits associated with the route being traversed by the vehicle;
determine, using a learned heuristic developed based on data associated with historic operation of the vehicle, a length for each route segments of the one or more route segments, wherein the historic operation of the vehicle corresponds to operation of the vehicle along at least one route having at least one route characteristic in common with the route being traversed by the vehicle;
determine, for each route segment of the one or more route segments, a vehicle energy consumption profile, wherein the vehicle energy consumption profile is determined based on at least historical data associated with at least one other vehicle for at least a portion of a route previously traversed by at the least one other vehicle having at least one route characteristic corresponding to at least one route characteristic of the route being traversed by the vehicle;
determine, for each of the one or more route segments, a profile for a target vehicle speed based on at least one route characteristic and a corresponding vehicle energy consumption profile;
determine, for each of the one or more route segments, a state of charge profile for at least one battery of the vehicle, wherein the state of charge profile includes at least one state of charge bound;

for a respective route segment of the one or more route segments:
generate one or more torque commands based on at least the target vehicle speed profile corresponding to the respective route segment; and
selectively control, using the one or more torque commands and the state of charge bound corresponding to the respective route segment, vehicle propulsion of the vehicle to achieve the target vehicle speed profile.

11. The system of claim 10, wherein the state of charge profile for the at least one battery of the vehicle is based on at least one state of charge parameter.

12. The system of claim 11, wherein the instructions further cause the processor to, generate the one or more torque commands for the respective route segment of the one or more route segments further based on a state of charge profile corresponding to the respective route segment of the one or more route segments.

13. The system of claim 11, wherein the at least one state of charge parameter includes at least one of one or more vehicle speed limit change locations associated with the route being traversed by the vehicle, one or more traffic signal locations associated with the route being traversed by the vehicle, one or more stop sign locations associated with the route being traversed by the vehicle, a weight parameter associated energy consumption associated with the route being traversed by the vehicle and a travel time associated with the route being traversed by the vehicle, one or more road grades associated with the route being traversed by the vehicle, a vehicle mass associated with the vehicle, and a battery size associated with the at least one battery of the vehicle.

14. The system of claim 10, wherein the cumulative net energy consumption of the vehicle further includes and a potential energy aspect.

15. The system of claim 14, wherein the instructions further cause the processor to receive posted speed limit information associated with the route being traversed by the vehicle and determine the kinetic energy aspect of the cumulative net energy consumption of the vehicle based on the received posted speed limit information associated with the route being traversed by the vehicle.

16. The system of claim 14, wherein the instructions further cause the processor to determine the potential energy aspect of the cumulative net energy consumption of the vehicle based on one or more route elevations associated with the route being traversed by the vehicle.

17. The system of claim 10, wherein each route segment of the one or more route segments includes a substantially equal segment length.

18. The system of claim 10, wherein at least one route segment of the one or more route segments includes a segment length that is different from at least one other route segment of the one or more route segments.

19. An apparatus for controlling vehicle energy consumption, the apparatus comprising:
a processor; and
a memory including instructions that, when executed by the processor, cause the processor to:
identify, using a rolling buffer corresponding to a cumulative net energy consumption of a vehicle traversing a route, one or more route segments of the route being traversed by the vehicle, wherein the cumulative net energy consumption of the vehicle includes a kinetic energy aspect determined based on one or more posted speed limits associated with the route being traversed by the vehicle;

determine, using a learned heuristic developed based on data associated with historic operation of the vehicle, a length for each route segments of the one or more route segments, wherein the historic operation of the vehicle corresponds to operation of the vehicle along at least one route having at least one route characteristic in common with the route being traversed by the vehicle;

determine, for each route segment of the one or more route segments, a vehicle energy consumption profile;

determine, for each of the one or more route segments, a profile for a target vehicle speed based on at least one route characteristic and a corresponding vehicle energy consumption profile, wherein the vehicle energy consumption profile is determined based on at least historical data associated with at least one other vehicle for at least a portion of a route previously traversed by at the least one other vehicle having at least one route characteristic corresponding to at least one route characteristic of the route being traversed by the vehicle;

determine, for each route segment of the one or more route segments, a state of charge profile and at least one state of charge bound for at least one battery of the vehicle based on at least one state of charge parameter;

for a respective route segment of the one or more route segments:

generate one or more torque commands based on at least the target vehicle speed profile and a state of charge profile corresponding to the respective route segment; and selectively control, using the one or more torque commands and the at least one state of charge bound corresponding to the respective route segment, vehicle propulsion of the vehicle to achieve the target vehicle speed profile.

20. The apparatus of claim 19, wherein the at least one state of charge parameter includes at least one of one or more vehicle speed limit change locations associated with the route being traversed by the vehicle, one or more traffic signal locations associated with the route being traversed by the vehicle, one or more stop sign locations associated with the route being traversed by the vehicle, a weight parameter associated energy consumption associated with the route being traversed by the vehicle and a travel time associated with the route being traversed by the vehicle, one or more road grades associated with the route being traversed by the vehicle, a vehicle mass associated with the vehicle, and a battery size associated with the at least one battery of the vehicle.

* * * * *